US012671547B2

(12) United States Patent　(10) Patent No.: US 12,671,547 B2

Rahman　(45) Date of Patent: Jun. 30, 2026

(54) USER EQUIPMENT DRIVEN SOUNDING REFERENCE SIGNAL TRANSMISSIONS IN DIFFERENT FREQUENCY LOCATIONS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 556 days.

(21) Appl. No.: 18/187,933

(22) Filed: Mar. 22, 2023

(65) Prior Publication Data

US 2024/0322968 A1　Sep. 26, 2024

(51) Int. Cl.
*H04L 5/00*　(2006.01)

(52) U.S. Cl.
CPC .......... *H04L 5/0051* (2013.01); *H04L 5/0012* (2013.01)

(58) Field of Classification Search
CPC ... H04L 25/0226; H04L 5/0051; H04L 5/001; H04L 5/0053; H04L 5/0048; H04L 5/0094; H04L 5/0012; H04L 5/0007; H04W 72/0453
See application file for complete search history.

(56) References Cited

U.S. PATENT DOCUMENTS

| | | |
|---|---|---|
| 7,940,740 B2 | 5/2011 | Krishnamurthy et al. |
| 8,046,029 B2 | 10/2011 | Teo et al. |
| 8,086,272 B2 | 12/2011 | Teo et al. |
| 8,140,102 B2 | 3/2012 | Nory et al. |
| 8,526,391 B2 | 9/2013 | Issakov et al. |
| 8,842,614 B2 | 9/2014 | Liu et al. |
| 8,965,434 B2 | 2/2015 | Suh et al. |
| 9,025,471 B2 | 5/2015 | Mehta et al. |
| 9,088,332 B2 | 7/2015 | Boudreau et al. |
| 9,185,711 B2 | 11/2015 | Lin et al. |
| 9,253,766 B2 | 2/2016 | Yang et al. |

(Continued)

FOREIGN PATENT DOCUMENTS

| | | |
|---|---|---|
| CN | 106411375 A | 2/2017 |
| CN | 104170300 B | 8/2018 |

(Continued)

*Primary Examiner* — Shukri Taha

(74) *Attorney, Agent, or Firm* — Perkins Coie LLP

(57) ABSTRACT

1. Techniques related to user-device-driven sounding reference signals (SRS) transmission using different zones of operating frequency bands are disclosed. In one example aspect, a method for wireless communication includes receiving, by a wireless device, configuration information for a sounding reference signal from a base station in a first frequency region of an operating frequency band and determining, by the wireless device, one or more configured frequency positions for transmitting the sounding reference signal based on the frequency domain information of a sounding reference signal resource. The method also includes determining, by the wireless device, an additional frequency position within a second frequency region that is different from the first frequency region. The method further includes transmitting, by the wireless device, the sounding reference signal to the base station using the one or more configured frequency positions and the additional frequency position.

20 Claims, 5 Drawing Sheets

(56) References Cited

U.S. PATENT DOCUMENTS

| | | | |
|---|---|---|---|
| 9,276,710 B2 | 3/2016 | Damnjanovic et al. | |
| 9,420,584 B2 | 8/2016 | Blankenship et al. | |
| 9,801,171 B2 | 10/2017 | Kim | |
| 10,090,986 B2 | 10/2018 | Kim et al. | |
| 10,506,376 B2 | 12/2019 | Markhovsky et al. | |
| 10,637,709 B2 | 4/2020 | Bai et al. | |
| 10,651,962 B2 | 5/2020 | Liu et al. | |
| 10,834,715 B2 | 11/2020 | Sun et al. | |
| 10,925,040 B2 | 2/2021 | Zhou | |
| 11,139,931 B2 | 10/2021 | Wei et al. | |
| 11,323,157 B2 | 5/2022 | Zhang et al. | |
| 12,063,689 B2 * | 8/2024 | Zhang | H04W 72/21 |
| 12,107,785 B2 * | 10/2024 | Sun | H04L 5/0048 |
| 12,120,655 B2 * | 10/2024 | Abdelghaffar | H04L 27/26132 |
| 2011/0090862 A1 | 4/2011 | Liang et al. | |
| 2011/0294529 A1 | 12/2011 | Luo et al. | |
| 2013/0294282 A1 | 11/2013 | Seo | |
| 2013/0322280 A1 | 12/2013 | Pi | |
| 2015/0181589 A1 | 6/2015 | Luo et al. | |
| 2020/0007294 A1 | 1/2020 | Yang et al. | |
| 2020/0014515 A1 * | 1/2020 | Qin | H04L 5/0051 |
| 2021/0100039 A1 | 4/2021 | Zhang et al. | |
| 2021/0144716 A1 | 5/2021 | Choi et al. | |
| 2021/0185614 A1 | 6/2021 | Zhou et al. | |
| 2022/0103324 A1 | 3/2022 | Ly et al. | |
| 2022/0109541 A1 | 4/2022 | Cirik et al. | |
| 2022/0217774 A1 | 7/2022 | Kim et al. | |
| 2022/0224444 A1 | 7/2022 | Go et al. | |
| 2022/0224461 A1 | 7/2022 | Lee et al. | |
| 2022/0224498 A1 | 7/2022 | Cha et al. | |
| 2022/0248385 A1 | 8/2022 | Cha et al. | |
| 2022/0263621 A1 | 8/2022 | Cha et al. | |
| 2022/0311492 A1 | 9/2022 | Wu et al. | |
| 2024/0267186 A1 * | 8/2024 | Yang | H04L 5/0051 |
| 2025/0016793 A1 * | 1/2025 | Matsumura | H04L 5/0094 |

FOREIGN PATENT DOCUMENTS

| | | | |
|---|---|---|---|
| CN | 110719156 B | 7/2020 | |
| CN | 108076478 B | 10/2020 | |
| CN | 107534986 B | 12/2020 | |
| CN | 109039555 B | 12/2020 | |
| CN | 110351822 B | 9/2021 | |
| CN | 110831162 B | 4/2022 | |

* cited by examiner

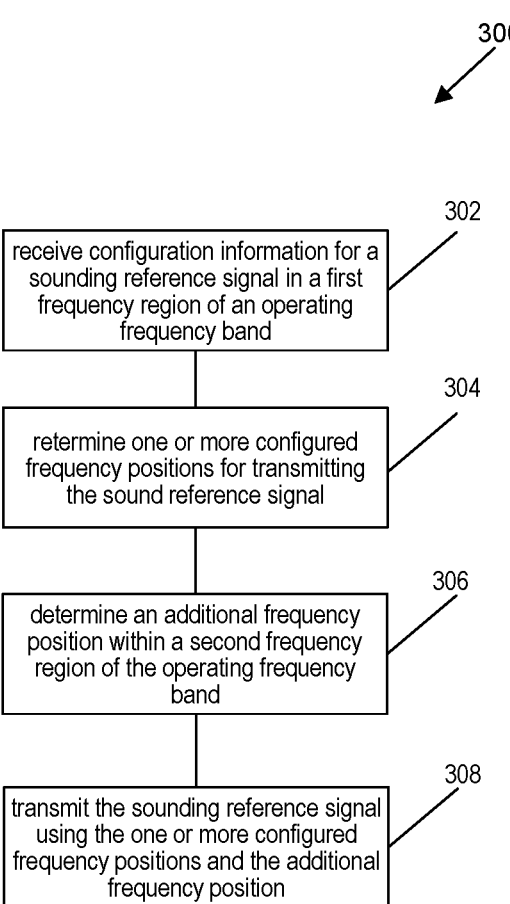

300

302
receive configuration information for a sounding reference signal in a first frequency region of an operating frequency band 304
retermine one or more configured frequency positions for transmitting the sound reference signal 306
determine an additional frequency position within a second frequency region of the operating frequency band 308
transmit the sounding reference signal using the one or more configured frequency positions and the additional frequency position

USER EQUIPMENT DRIVEN SOUNDING REFERENCE SIGNAL TRANSMISSIONS IN DIFFERENT FREQUENCY LOCATIONS

BACKGROUND

Sounding Reference Signal (SRS) is a reference signal transmitted by a user equipment (UE) in the uplink direction. The SRS is used by a base station to estimate the quality of an uplink channel for large bandwidths outside the assigned span to a specified UE. The SRS provides information about the combined effect of multipath fading, scattering, Doppler and power loss of transmitted signals.

BRIEF DESCRIPTION OF THE DRAWINGS

Detailed descriptions of implementations of the present invention will be described and explained through the use of the accompanying drawings.

FIG. 3 is a flowchart representation of an example process for wireless communication in accordance with one or more embodiments of the present technology.

Figure 1:
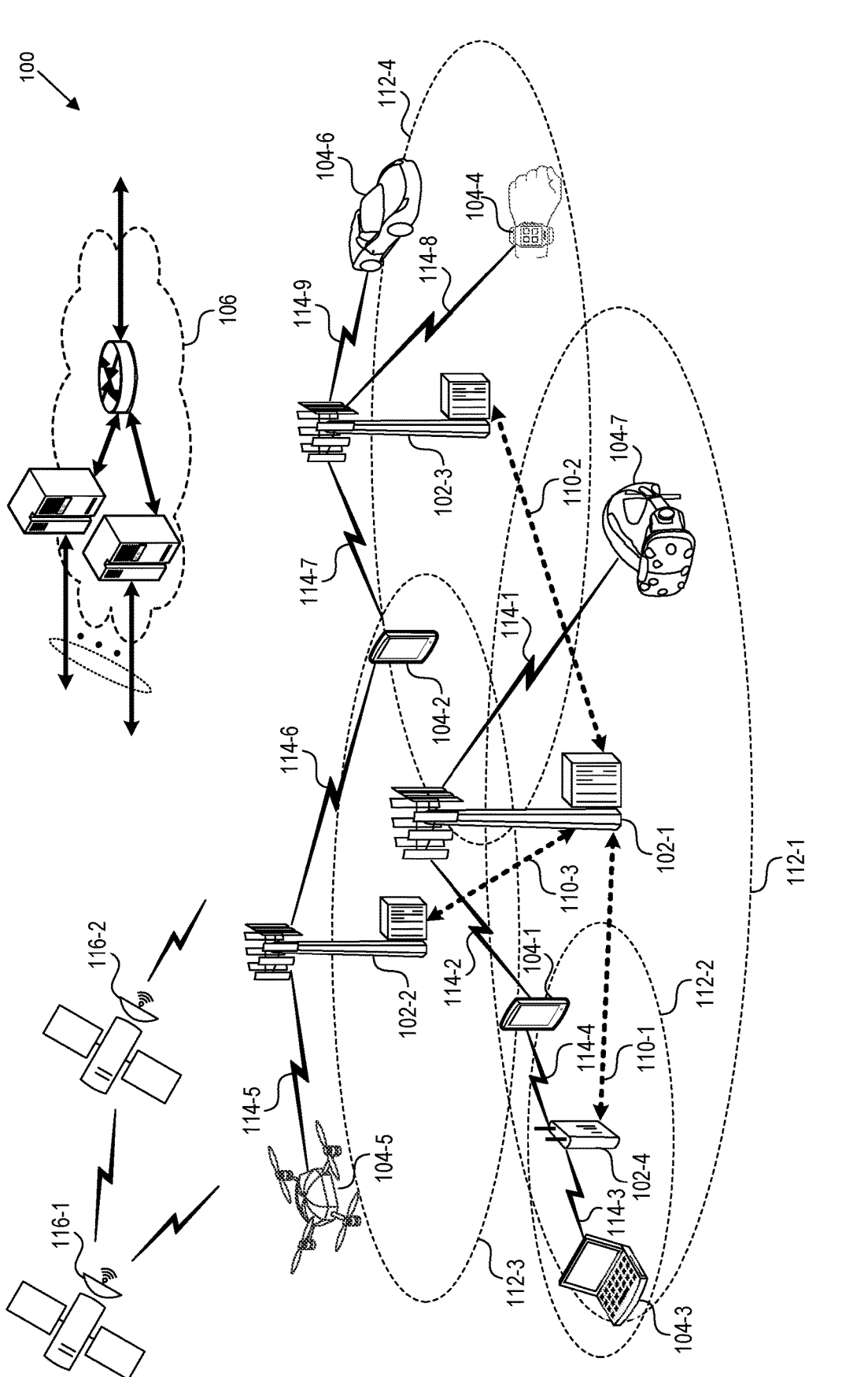
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In wireless communications, uplink communication generally refers to transmissions from UE to a base station, and uplink frequency is the frequency used for transmissions from the UE to the base station. Downlink communication generally refers to transmissions from the base station to the UE, and downlink frequency is the frequency used for transmissions from the base station to the UE. The base station can perform uplink channel estimation using reference signals such as the Demodulation Reference Signal (DMRS) on the Physical Uplink Shared Channel (PUSCH). However, channel estimation using the PUSCH DMRS can be limited because the PUSCH DMRS is transmitted only when PUSCH is scheduled. On the other hand, the SRS can be transmitted independently from PUSCH and can provide uplink channel quality estimation independent of PUSCH DMRS. With the advance of the Fifth-Generation (5G)/New Radio (NR) access technology, the SRS plays a more important role because Time Division Duplex (TDD) is the main mode of 5G deployment. In TDD, the base station can utilize the channel estimation results from the SRS not only for uplink (UL) scheduling but also for downlink (DL) scheduling based on channel reciprocity in TDD.

Traditionally, the base station configures SRS parameters and transmits the configuration to the UE. The UE then transmits the SRS using the configuration so that the base station can measure the SRS and determine the channel quality of uplink communication. Because the configuration is done by the base station prior to receiving the SRS from the UE, the base station may not be aware of the deteriorating channel conditions in a timely manner.

The disclosed technologies address these and other problems of conventional systems by allowing the UE to autonomously determine different frequency locations in one or more operating bands to transmit SRS. In 5G/NR communications, an operating band is a frequency band associated with a certain set of radio frequency (RF) requirements. Bandwidths of different operating bands can vary from several MHz to a few GHz (e.g., n41, n78, n261 for TDD; n25, n66 for FDD). The base station informs the UE of the channel bandwidth of a cell within an operating band, as well as the position and width of one or more Bandwidth Parts (BWPs), where a BWP is a set of contiguous resource blocks configured inside a channel bandwidth. The disclosed technologies enable the UE to leverage different zones of operating band(s) in addition to the operating band configured by the base station. The UE can inform the base station of the different zones that it chooses for transmitting the SRS to ensure that the base station can properly detect the SRS. In response to receiving the SRS from different zones of operating band(s), the base station can analyze the channel conditions of the SRS signals (e.g., over a period of time) to determine frequencies with desirable propagation characteristics. In some embodiments, the base station reconfigures the uplink channel(s) using the desired frequency or frequencies to achieve improved propagation characteristics for subsequent uplink communication.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

UE-Driven SRS Transmission

Figure 2:
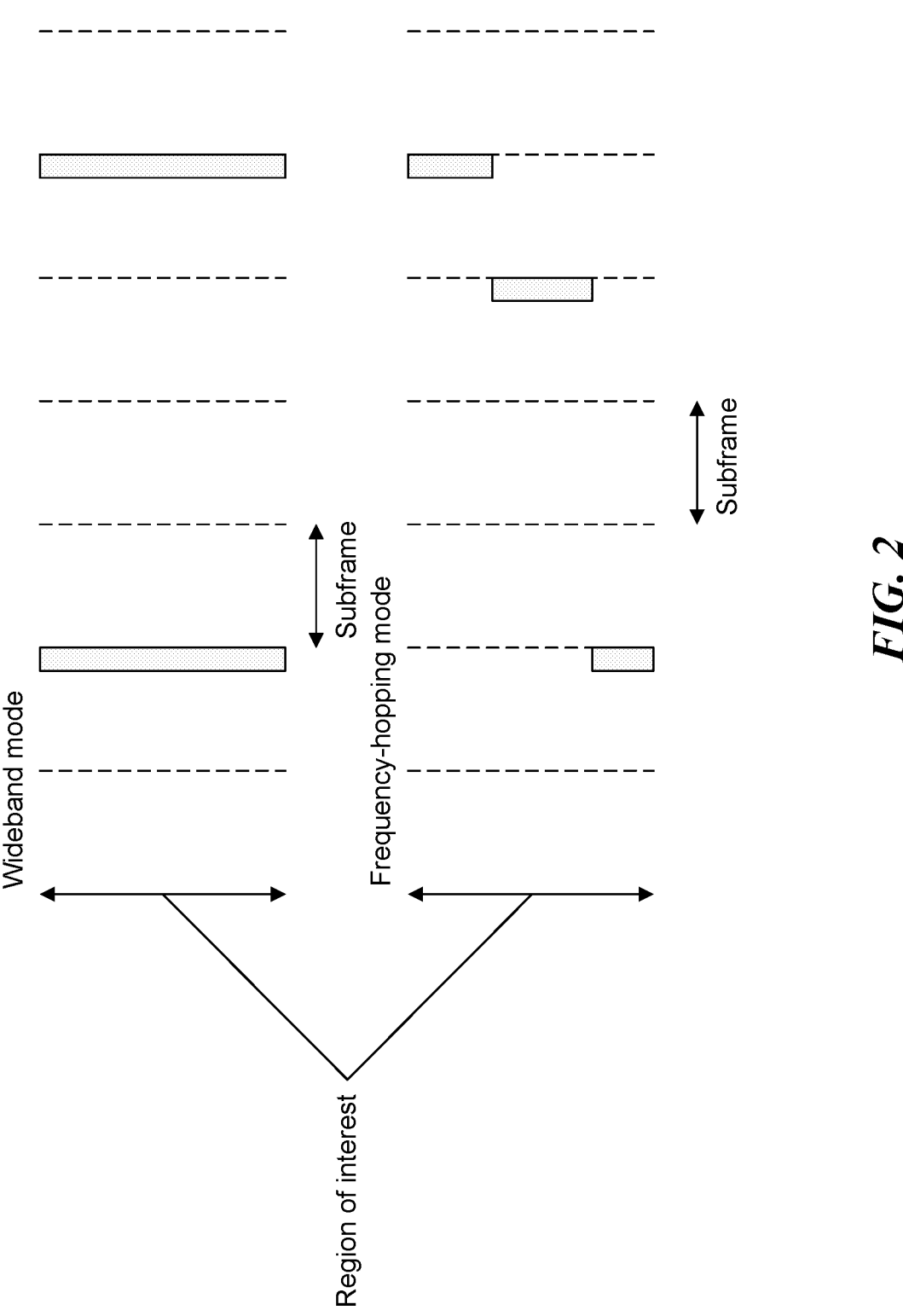
FIG. 2 illustrates example transmission modes for Sounding Reference Signal (SRS) transmissions.

The SRS is transmitted from the UE to the base station independently from PUSCH to provide uplink channel quality estimation. The SRS can be transmitted using different modes. FIG. 2 illustrates example transmission modes for SRS transmissions. In wideband mode, one single transmission of the SRS covers the bandwidth. The channel quality estimate is obtained within a single symbol. However, uplink communication can be impaired if UE remains in a specific operating 5G NR band that has poor channel characteristics (e.g., poor uplink throughput, latency, fading, packet loss, jitter, and signal loss). Correspondingly, using the wideband mode can result in a poor channel estimate with poor channel conditions. To mitigate such problems, the hopping modes (e.g., frequency hopping and/or group hopping) can be used. In the hopping modes, the base station can split the SRS transmission into a series of narrowband transmissions that cover the bandwidth to mitigate the impact of having poor channel conditions. The hopping modes can help address the poor channel estimate issues under deteriorating channel conditions. However, the base station may not be aware of the deteriorating channel conditions in a timely manner. The base-station-driven SRS transmission approach is thus not sufficient to detect real-time or near real-time channel condition deteriorations to provide optimal experiences for applications that require reliability and low latencies.

This patent document discloses techniques that can be implemented in various embodiments to provide a UE-driven SRS transmission approach to enable accurate channel estimations by the base station in a timely manner. The disclosed technologies address the shortcomings of the base-station-driven SRS transmission approach by enabling the UE to autonomously determine different zone of operating band(s) for SRS transmissions. For example, the UE can analyze frequencies that are in proximity to the configured Physical Uplink Control Channel (PUCCH) and/or the Physical Uplink Shared Channel (PUSCH). In addition, the UE can analyze frequencies that are away from the frequencies of the PUCCH/PUSCH channels. Correspondingly, the UE can transmit the SRS signals using different frequency locations that span across different regions of the operating band(s). In response to receiving the SRS signals with varying frequency locations, the base station assesses the received SRS signals to identify the frequencies with desirable propagation characteristics for uplink channel(s). The base station can assess the received SRSs over a period of time and determine that a specific frequency region within a specific operating band provides better propagation characteristics. The base station then re-tunes the uplink frequency for subsequent uplink communication to achieve better transmission performance.

FIG. 3 is a flowchart representation of an example process/method for wireless communication in accordance with one or more embodiments of the present technology. The process/method 300 comprises, at Operation 302, receiving, by a wireless device from a base station, configuration information for SRS in a first frequency region of an operating frequency band. The first frequency region can be a predetermined or pre-configured region of the operating frequency band. In some embodiments, the base station transmits the SRS configuration information using radio resource control (RRC) messages. Examples of the SRS configuration information in the RRC messages include information about a set of SRS resources for the UE to transmit the SRS, frequency bandwidth allocated for SRS transmission, channel characteristics of the frequency bandwidth, and desired subframes at which the UE is to transmit the SRS. The sounding reference signal can be transmitted in a periodic manner or in an aperiodic manner. In some embodiments, the predetermined frequency region of the operating frequency band is an active bandwidth part (BWP). BWP is a contiguous set of resource blocks within a given frequency bandwidth. The predetermined frequency region can be an active BWP configured by the base station. The predetermined frequency region can also be an initial BWP, a default BWP, or one of the other configured BWPs. In some embodiments, a frequency region comprises one or more subcarriers in the frequency domain.

At Operation 304, the wireless device (also referred to as UE) determines one or more configured frequency positions for transmitting the SRS. The one or more configured frequency positions are within the predetermined frequency region of the operating frequency band specified in the configuration information from the base station. In some embodiments, the base station configures the UE to transmit the SRS using a frequency-hopping mode. In the frequency-hopping mode, the SRS transmission is split into a series of narrowband transmissions where each narrowband transmission is associated with one of the one or more configured frequency positions.

At Operation 306, the UE determines an additional frequency position within a new frequency region. The new frequency region is different from the predetermined frequency region of the operating frequency band. For example, the UE can be configured with multiple BWPs, with one BWP being the active BWP in the operating frequency band. The UE can autonomously determine additional frequency position(s) in the non-active BWP(s) for SRS transmissions. As another example, the UE can determine that the new frequency region is located in a different operating band and select additional frequency position(s) in the different operating band.

In some embodiments, the UE decides to search for the additional frequency position within the new frequency region in response to the UE detecting that the predetermined frequency region exhibits a channel condition lower than a threshold value. The threshold value is configured by the base station and indicates a minimum channel condition of a frequency region required for SRS transmission. In some embodiments, the UE decides to search for the additional frequency position within the new frequency region regardless of the channel condition of the predetermined frequency region.

In some embodiments, upon determining that a single frequency position exhibits the most desirable channel characteristics for the bandwidth region of interest, the UE configures one additional frequency position for transmitting the SRS. In some embodiments, upon determining that multiple frequency positions exhibit desirable channel characteristics for portions of the region of interest, the UE configures multiple frequency positions for transmitting the SRS in respective portions of the bandwidth region of interest.

For example, a UE can be configured to camp on the n41 operating band (2500 MHz). Once configured, the UE performs transmissions on specific subcarrier(s) or an exact frequency, also known as Absolute Radio Frequency Number (ARFCN) within the n41 operating band. The UE is also capable to monitor and communicate over other subcarrier (s) within the same operating band. The UE can monitor one or more subcarriers that are adjacent to the configured subcarrier(s) and select some of them as the additional frequency position(s).

In some embodiments, when frequency-hopping is configured by the base station, the UE can combine frequency-hopping with the one or more frequency positions in the new frequency region identified by the UE to achieve optimal channel estimation. Alternatively, for the SRS transmission in the additional frequency position(s) identified by itself, the UE can ignore the frequency-hopping configuration from the base station.

At Operation 308, the UE transmits the SRS using the one or more configured frequency positions and the additional frequency position(s). In some embodiments, the UE and the base station can agree upon a pre-determined set of candidate frequency positions. The set of candidate frequency positions can also be negotiated and updated based on additional signaling between the base station and the UE. For example, when mobility events occur and the coverage areas of the source and target base stations change, the additional negotiation and updates of the set of candidate frequency positions helps the UE to better tune to the coverage area of the target base station. In some embodiments, the UE can transmit an indication to the base station, e.g., via uplink control information, to indicate the additional frequency positions(s) that it intends to use for SRS transmissions. The indication from the UE can enable the base station to properly detect the SRS transmissions so as to determine the uplink channel conditions.

In some embodiments, after transmitting the SRS to the base station, the wireless device receives reconfiguration information from the base station. The reconfiguration information can include a switch from the predetermined frequency region to the new frequency region. The reconfiguration information can also include channel characteristics information of the predetermined frequency region and/or the new frequency region. For example, the reconfiguration information indicates that for one portion of the region of interest, a configured frequency position within the predetermined frequency region is least likely to experience latency and packet loss and is thus the preferred frequency position. The reconfiguration information also indicates that for another portion of the region of interest, the additional frequency position within the new frequency region is least likely to experience latency, packet loss, and signal loss and is the preferred frequency position. After receiving the reconfiguration information, the UE performs subsequent communication with the base station using the preferred frequency positions as indicated by the reconfiguration information.

Figure 4:
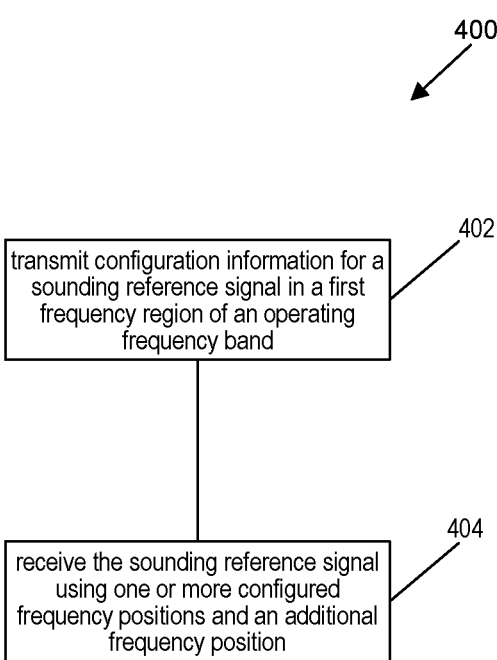
FIG. 4 is a flowchart implementation of another example process for wireless communication in accordance with one or more embodiments of the present technology.

FIG. 4 is a flowchart representation of another process/method for wireless communication in accordance with one or more embodiments of the present technology. The process/method 400 includes, at Operation 402, transmitting, by a base station to a wireless device, configuration information for an SRS in a first frequency region of an operating frequency band. The first frequency region can be a predetermined or pre-configured region of the operating frequency band. As discussed in connection with FIG. 3, the configuration information can include information about multiple SRS for the UE to transmit the SRS, frequency bandwidth allocated for SRS transmission, channel characteristics of the frequency bandwidth, and desired subframes at which the UE is to transmit the SRS. The sounding reference signal can be transmitted in a periodic manner or in an aperiodic manner.

At Operation 404, the base station receives the SRS from the wireless device using one or more configured frequency positions and at least one additional frequency position. In some embodiments, the one or more configured frequency positions are determined based on the information about the multiple SRS included in the configuration information. The additional frequency position(s) are in a new frequency region of the operating band. The new frequency region is different from the first frequency region of the operating frequency band. For example, the new frequency region can be in the same operating frequency band as the first frequency region, with different locations. The new frequency region can also be in a different operating band.

In some embodiments, the base station receives signals (e.g., via uplink control information UCI) from the UE indicating the additional frequency position(s) within the new frequency region to enable the base station to properly detect the SRS transmissions from the UE. In some embodiments, when frequency-hopping is configured by the base station, the base station receives the SRS using the one or more configured frequency positions and the additional frequency position(s) in combination with the frequency-hopping mechanism. In some embodiments, frequency-hopping is not adopted in the additional frequency position(s) selected by the UE.

The base station determines the channel conditions of the one or more configured frequency positions and the additional frequency positions to determine frequency positions with optimal channel conditions. In some embodiments, the base station transmits reconfiguration information to the UE based on the SRS received from the UE. The reconfiguration information can include a switch from the predetermined frequency region to the new frequency region. The reconfiguration information can also include channel characteristics information of the predetermined frequency region and/or the new frequency region. Upon determining that the predetermined frequency region exhibits unsatisfactory channel conditions (e.g., a measurement result being below a threshold value), the base station transmits reconfiguration information requesting the switch from the predetermined frequency region to the new frequency region. Subsequent SRS transmissions by the UE to the base station are performed using the new frequency region until the base station transmits another reconfiguration information requesting another switch.

In some embodiments, the base station can determine the channel condition(s) based on the SRS transmission from the UE over a period of time. The period of time or the time duration can be predetermined and/or configured by the network operator. For example, the base station can use a timer to control the time duration for tracking SRS transmissions from frequency position(s) in the new frequency region selected by the UE.

Computer System

Figure 5:
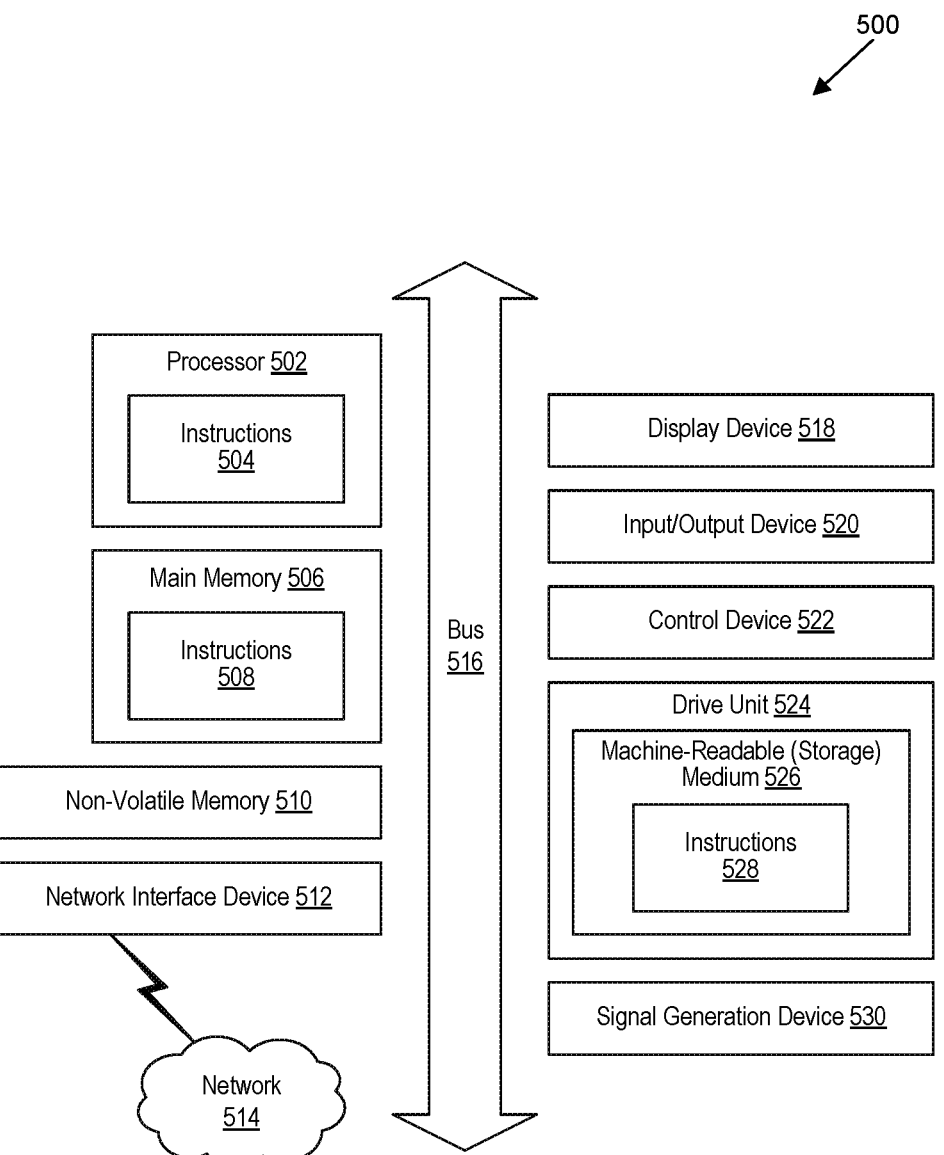
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method for wireless communication, comprising:
receiving, by a wireless device, configuration information for a sounding reference signal from a base station in a first frequency region of an operating frequency band,
wherein the configuration information comprises information about a set of sounding reference signal resources for the wireless device to transmit the sounding reference signal, and
wherein each sounding reference signal resource is configured with frequency domain information;
determining, by the wireless device, one or more configured frequency positions for transmitting the sounding reference signal based on the frequency domain information of a sounding reference signal resource,
wherein the one or more configured frequency positions are within the first frequency region;
determining, by the wireless device, an additional frequency position within a second frequency region different from the first frequency region,
wherein the additional frequency position is located in a non-active bandwidth part (BWP); and
transmitting, by the wireless device, the sounding reference signal to the base station using the one or more configured frequency positions and the additional frequency position.

2. The method of claim 1, further comprising:
receiving, by the wireless device, reconfiguration information from the base station,
wherein the reconfiguration information indicates a switch from the first frequency region to the second frequency region; and
performing subsequent communication with the base station using the second frequency region.

3. The method of claim 1, wherein the first frequency region comprises an active bandwidth part.

4. The method of claim 1, wherein the one or more configured frequency positions comprise a frequency hopping position that is configured by the frequency domain information of the sounding reference signal resource, and wherein the additional frequency position is different from the frequency hopping position.

5. The method of claim 1, wherein the determining of the additional frequency position with the second frequency region is in response to the wireless device detecting a channel condition of the first frequency region being worse than a threshold.

6. The method of claim 5, wherein the threshold is predefined or is configured by the base station.

7. The method of claim 1, wherein transmitting of the sounding reference signal is periodic or aperiodic.

8. A method for wireless communication, comprising:
transmitting, by a network node, configuration information for a sounding reference signal to a wireless device in a first frequency region of an operating frequency band,
wherein the configuration information comprises information about a set of sounding reference signal resources for the wireless device to transmit the sounding reference signal, and
wherein each sounding reference signal resource is configured with frequency domain information;

receiving, by the network node, the sounding reference signal from the wireless device using one or more configured frequency positions and an additional frequency position, wherein the one or more configured frequency positions are determined based on the frequency domain information of the sounding reference signal resource, wherein the additional frequency position is selected by the wireless device, wherein the additional frequency position is located in a non-active bandwidth part (BWP), and wherein the additional frequency position is within a second frequency region that is different from the first frequency region.

9. The method of claim 8, further comprising:

transmitting, by the network node, reconfiguration information to the wireless device based on the sounding reference signal, wherein the reconfiguration information indicates a switch from the first frequency region to the second frequency region.

10. The method of claim 8, wherein the first frequency region comprises an active bandwidth part.

11. The method of claim 8, wherein the one or more configured frequency positions comprise a frequency hopping position that is configured by the frequency domain information of the sounding reference signal resource, and wherein the additional frequency position is different from the frequency hopping position.

12. The method of claim 8, wherein the sounding reference signal is transmitted in a periodic manner or in an aperiodic manner.

13. The method of claim 8, wherein the first frequency region and the second frequency region are in different operating bands.

14. A device for wireless communication, comprising:

at least one hardware processor; and at least one non-transitory memory storing instructions, which, when executed by the at least one hardware processor, cause the device to:

receive, from a network node, configuration information for a sounding reference signal in a first frequency region of an operating frequency band, wherein the configuration information comprises information about a set of sounding reference signal resources for the device to transmit the sounding reference signal, and wherein each sounding reference signal resource is configured with frequency domain information;

determine one or more configured frequency positions and an additional frequency position for transmitting the sounding reference signal, wherein the one or more configured frequency positions are based on the frequency domain information of a sounding reference signal resource, wherein the one or more configured frequency positions are within the first frequency region, wherein the additional frequency position is located in a non-active bandwidth part (BWP), and wherein the additional frequency position is within a second frequency region of the operating frequency band;

transmit the sounding reference signal to the network node using the one or more configured frequency positions and the additional frequency position.

15. The device of claim 14, wherein the at least one hardware processor is further configured to:

receive reconfiguration information for the sounding reference signal, wherein the reconfiguration information comprises information about the first frequency region and the second frequency region.

16. The device of claim 14, wherein the first frequency region comprises an active bandwidth part.

17. The device of claim 14, wherein the one or more configured frequency positions comprise a frequency hopping position that is configured by the frequency domain information of the sounding reference signal resource, and wherein the additional frequency position is different from the frequency hopping position.

18. The device of claim 14, wherein the at least one hardware processor is configured to determine the additional frequency position with the second frequency region in response to detecting a channel condition of the first frequency region being worse than a threshold.

19. The device of claim 18, wherein the threshold is predefined or is configured by the network node.

20. The device of claim 14, wherein the at least one hardware processor is configured to transmit the sounding reference signal periodically or in an aperiodic manner.

* * * * *